United States Patent [19]

Gerry et al.

[11] 4,339,502
[45] Jul. 13, 1982

[54] TIE-LAYER FOR COEXTRUDED ACRYLONITRILE COPOLYMERS

[75] Inventors: Frank S. Gerry, Hudson; Wayne T. Wiggins, Aurora, both of Ohio

[73] Assignee: SOHIO, Cleveland, Ohio

[21] Appl. No.: 220,217

[22] Filed: Dec. 24, 1980

Related U.S. Application Data

[63] Continuation-in-part of Ser. No. 99,113, Nov. 29, 1979, Pat. No. 4,243,725.

[51] Int. Cl.³ .................... B32B 27/28; B32B 27/32
[52] U.S. Cl. .................... 428/411; 428/412; 428/423.1; 428/423.3; 428/423.5; 428/424.2; 428/424.6; 428/424.7; 428/475.8; 428/476.1; 428/517; 428/518; 428/519; 428/520; 428/522; 156/243; 156/244.11; 264/171
[58] Field of Search .............. 428/424.2, 424.7, 520, 428/517, 518, 522, 519, 411, 412, 423.3, 423.1, 423.5, 424.6, 475.8, 476.1; 264/171; 156/244.11, 243

[56] References Cited

U.S. PATENT DOCUMENTS

| | | | |
|---|---|---|---|
| 3,426,102 | 2/1969 | Solak | 525/310 |
| 3,682,768 | 8/1972 | Adams | 428/520 |
| 3,993,810 | 11/1976 | Bonis | 428/517 |
| 4,081,424 | 3/1978 | Gergen | 525/184 |
| 4,100,237 | 7/1978 | Wiley | 264/171 |
| 4,101,702 | 7/1978 | Churchill | 428/520 |
| 4,123,576 | 10/1978 | Kobayashi | 428/516 |
| 4,139,665 | 2/1979 | Herrero | 428/520 |

FOREIGN PATENT DOCUMENTS

49-39656 4/1974 Japan.

Primary Examiner—Ellis P. Robinson
Attorney, Agent, or Firm—W. D. Mooney; Herbert D. Knudsen; Larry W. Evans

[57] ABSTRACT

This invention relates to a blend of a vinyl aromatic-diene block copolymer rubber and a nitrile barrier resin, and to the use of this mixture as a tie-layer to adhere a nitrile barrier resin to a thermoplastic resin.

13 Claims, No Drawings

TIE-LAYER FOR COEXTRUDED ACRYLONITRILE COPOLYMERS

CROSS-REFERENCE TO RELATED APPLICATIONS

This application is a continuation-in-part of U.S. Ser. No. 099,113, which was filed on Nov. 29, 1979 now U.S. Pat. No. 4,243,725.

BACKGROUND OF THE INVENTION

This invention relates to a mixture of a vinyl aromatic-diene block copolymer rubber and a nitrile barrier resin, and to the use of this mixture as a tie-layer to adhere together a nitrile barrier resin and a thermoplastic resin. Optionally, these tie-layers contain additional thermoplastic resins.

Composite structures composed of at least one layer of a thermoplastic resin and at least one layer of a nitrile barrier resin have been prepared and are found to be useful for many purposes, primarily for packaging. Packages of such composites have excellent gas barrier properties, particularly for oxygen and carbon dioxide. Manufacture of such composites is not easy because of the lack of adhesion between the surfaces of most thermoplastic resins and a nitrile barrier resin. This lack of adhesion has been improved in the past by the discovery of new adhesives such as those disclosed in U.S. Pat. No. 4,123,576.

One problem with many of the prior art adhesives is that they have very poor processability. The adhesives disclosed herein have excellent processability. Moreover, an additional advantage of the instant adhesives is that scrap material can be reground and used in the tie-layer with a minimum adjustment of the essential components.

SUMMARY OF THE INVENTION

It has now been discovered that laminated structures having a first outer surface comprising a nitrile barrier resin and a second outer surface comprising a thermoplastic resin can be made employing as the tie-layer for adhering these polymers together a mixture of (1) a vinyl aromatic-diene block copolymer rubber, and (2) a nitrile barrier resin. Preferred block copolymer rubbers include styrene-butadiene-styrene rubbers (SBS) and styrene-isoprene-styrene rubbers (SIS).

DETAILED DESCRIPTION

The laminated structures of this invention are adhered together by a tie-layer comprising (1) a vinyl aromatic-diene block copolymer rubber, and (2) a nitrile barrier resin. The vinyl aromatic-diene block copolymer rubbers are composed of a major proportion of a conjugated diene monomer, such as butadiene or isoprene, and a minor proportion of a vinyl aromatic, such as styrene.

The conjugated diene monomers useful in this invention include butadiene-1,3, isoprene, chloroprene, bromoprene, cyanoprene, 2,3-dimethyl butadiene-1,3, 2-ethyl butadiene-1,3, 2,3-diethyl butadiene-1,3 and the like. Most preferred for the purpose of this invention are butadiene and isoprene because of their ready availability and their excellent polymerization properties.

The term "vinyl aromatic" as used herein refers to styrene or any of the various substituted styrenes containing substituents which are inert to the polymerization reaction such as halogen and haloalkyl-substituted styrenes, hydrocarbon-substituted styrenes, alkoxy-styrenes, alkyloxy-styrenes, nitrile-styrenes, etc. Examples of such substituted styrenes include alpha-methyl styrene, 4-chloro styrene, 4-ethyl styrene, 2-methyl styrene, 2-phenyl styrene, 4-methoxy styrene, 3-nitor styrene, 2,4-dimethyl styrene, isopropyl styrene, 2,4-methyl-4-chloro styrene, vinyl naphthalene 2-methyl-4-benzyl styrene and mixtures thereof. In most instances, however, it is preferred to use styrene itself by reason of its low cost, commercial availability and excellence as a starting material for the preparation of the resin used in this invention.

The nitrile barrier resins useful in the tie-layer are those produced by polymerizing a major proportion of a monounsaturated nitrile, e.g. acrylonitrile, and a minor proportion of another monovinyl monomer component copolymerizable therewith, optionally in the presence of a diene rubber which may be a homopolymer or copolymer of a conjugated diene monomer.

These high nitrile polymeric compositions can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

The monounsaturated nitriles are the alpha, beta-olefinically unsaturated nitriles having the structure:

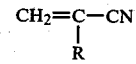

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred monounsaturated nitriles are acrylonitrile and methacrylonitrile and mixtures thereof.

The monomer component copolymerizable with the monounsaturated nitrile includes one or more of the esters of olefinically unsaturated carboxylic acids, vinyl esters, vinyl ethers, vinyl ketones, alpha-olefins, vinyl aromatic monomers and others.

The esters of olefinically unsaturated carboxylic acids include those having the structure:

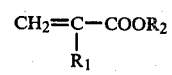

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins are those having at least 4 and as many as 10 carbon atoms having the structure:

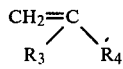

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octent-1, 2-ethyl butene-1, 2-propyl pentene-1, and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

The olefinic nitrile copolymer is optionally in the presence of a preformed diene rubber which may be a homopolymer or copolymer of a conjugated diene monomer. These monomers include butadiene-1,3, isoprene, chloroprene, bromoprene, cyanoprene, 2,3-dimethyl butadiene-1,3 2-ethyl butadiene-1,3, 2,3-diethyl butadiene-1,3 and the like. Most preferred for the purpose of this invention are butadiene-1,3 and isoprene because of their ready availability and their excellent polymerization properties.

The conjugated diene monomer may be copolymerized with a comonomer selected from the group consisting of vinyl aromatic monomer, an olefinic nitrile monomer having the structure:

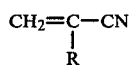

wherein R has the foregoing designation, and an ester having the structure:

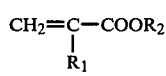

wherein $R_1$ and $R_2$ have the foregoing designations. The rubbery polymer contains from 50% to 100% by weight of polymerized conjugated diene monomer and from 0% to 50% by weight of the comonomer.

Preferred polymers useful in this invention are those prepared by the polymerization of 100 parts by weight of (A) from 60% to 90% by weight of at least one nitrile having the structure:

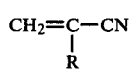

wherein R has the foregoing designation, and (B) from 10% to 40% by weight based on the combined weights of (A) and (B) of at least one member selected from the group consisting of (1) an ester having the structure:

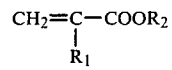

wherein $R_1$ and $R_2$ have the foregoing respective designations, (2) an alpha-olefin having the structure:

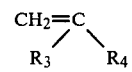

wherein $R_3$ and $R_4$ have the foregoing respective designations, (3) a vinyl ether selected from the group consisting of methyl vinyl ether, ethyl vinyl ether the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure:

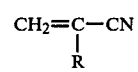

wherein R has the foregoing designation, and an ester having the structure:

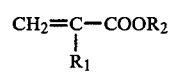

wherein $R_1$ and $R_2$ have the foregoing respective designations, said rubbery polymer containing from 50% to 100% by weight of polymerized conjugated diene and from 0% to 50% by weight of a comonomer.

The most preferred nitrile copolymers are prepared by the polymerization of between 70 and 80 parts by weight of (A) and 20 to 30 parts by weight of (B) in the presence of from 5 to 15 parts by weight of (C).

The tie-layer can contain additional components comprising one or more thermoplastic resins. Examples of thermoplastic resins which have been found to be effective in the tie-layer for improving adhesion include polyolefins such as polyethylene and polypropylene, styrenics such as styrene-acrylonitrile copolymers, acrylonitrile butadiene styrene terpolymers and polystyrene, nylons such as nylon-11, nylon-6, nylon-6,6, and nylon-12, polyvinyl chlorides and polyurethanes. This additional tie-layer component may be the same as or different from the thermoplastic resin which comprises the second outer layer of the laminate. Preferred tie-layers comprise a three component system containing a halogenated polyolefin, a nitrile barrier resin and the thermoplastic resin which comprises the second outer layer of the laminate. For example, to bond a nitrile barrier resin to polypropylene, it is preferred to use a tie-layer comprising a styrene-diene block copolymer rubber, nitrile barrier resin and polypropylene. It has also been discovered that the addition of polyurethane to the tie-layer improves adhesion.

The ratio of the various components in the tie-layer vary depending upon their identity and the identity of the outer layers of the laminate. Generally, the tie-layer contains about 15% to 70% of the styrene-diene block copolymer rubber, 10 to 60% of the nitrile barrier resin and 0 to 45% of one or more additional thermoplastic resins. Preferably, the tie-layer comprises 40 to 60% of a styrene-diene block copolymer rubber, 25 to 40% of a nitrile barrier resin and 5 to 25% of one or more additional thermoplastic resins.

The tie-layers of this invention can also contain antioxidants, lubricants or other processing aids. These additional components are well known.

The tie-layer components can be mixed by any of the generally known methods such as melt mixing in which a roll kneader, Banbury kneader or screw extruder is used.

These tie-layers are used to bond together in a molten state the outer layers of the laminate. One outer layer comprises the nitrile barrier resin discussed above. The second outer layer comprises a thermoplastic resin. Examples of thermoplastic resins which are suitable for the second outer layer include styrenics such as styrene acrylonitrile copolymers, acrylonitrile butadiene styrene terpolymers and polystyrene, polyolefins such as polyethylene and polypropylene, polyvinyl chlorides, polyurethanes, polycarbonates, polyamides such as nylon-11, nylon-12, nylon-6 and nylon-6,6 and polysulfones. Preferably, this outer layer comprises a polyolefin or styrenic. It is especially preferred to use the instant invention to bond together a nitrile barrier resin and a thermoplastic resin which would not bond together in the absence of a tie-layer.

Adhesion of the nitrile barrier resin and thermoplastic resin is easily achieved by the method of this invention. The resultant laminated structure may be in the form of a sheet, film, tube or hollow article such as a bottle. It is also possible to use any number of layers. Thus, a laminated structure comprising a nitrile barrier resin-tie layer-thermoplastic resin-tie layer-nitrile barrier resin an be produced. This sequence of layers can be continued to create any desired structure.

This invention is particularly applicable to the coextrusion process. In the coextrusion process, the outer layers of the laminate are adhered together in the molten phase while being shaped by passage through a die. The tie-layer is also in the molten state in the coextrusiion process and is also shaped by means of passing it through a die. The components of the tie-layer are weighed, powder blended and fed into an extruder hopper and continuously passed from the hopper to the extruder where they are mixed, heated to a melt and extruded between the two outer layers. The tie-layer components may also be introduced in the coextrusion process in a predensified form. The three shaped melt streams of polymer are combined using a coextrusion adapter and die in a one-step inline manufacturing operation. This permits the component layers to flow together to form the desired multi-layer structure.

The tie-layer can be extruded within a temperature range of 300° to 450° F. The exact temperature will depend on the identity of the thermoplastic resins being melted. Preferably, the tie-layer melt should be extruded between 390° and 410° F.

In making the composite coextruded structures of this invention, the pressure in the die may reach as high as 8,000 psi. The normal pressure is typically 2,500 psi.

SPECIFIC EMBODIMENTS

This invention is further illustrated in the following examples wherein the amounts of ingredients are expressed in parts by weight unless otherwise indicated. In the examples, the composite sheets were prepared using a coextrusion adapter which was of conventional feedblock design. Three extruders fed this multiple inlet heated block. The three still separate melt streams were aligned in the direction of the outlet and fed into a converging plate which directed the flow into the single manifold and die. At the point of entry into the die, the melts flowed into contact and distributed to the contour of the die.

EXAMPLE 1

A tie-layer consisting of a powdered mixture of 67 parts by weight of SBS (Shell's Kraton 2103, a styrene-butadiene-styrene block copolymer elastomer), and 33 parts by weight of a nitrile barrier resin comprising a nitrile rubber modified acrylonitrile-methyl acrylate copolymer prepared according to Example VIII in U.S. Pat. No. 3,426,102 was extruded through a ¾ inch Brabender extruder, through a three-way combining adapter and finally through a 6 inch coextrusion die. The melt temperature of the tie-layer was about 390° to 400° F. Simultaneously, the nitrile barrier resin and a high impact polystyrene (Arco's Dylene 601, a rubber modified polystyrene) were also coextruded on either side of the tie-layer. A resulting three layer laminate was produced. An adhesion of the tie-layer to the outer layers of the laminate of 1.82 pounds per linear inch was found.

EXAMPLE 2

The procedure of Example 1 was repeated except that the tie-layer blend was made up of 50 parts by weight of SBS and 50 parts by weight of the nitrile barrier resin. Adhesion between the layers was found to be 3.40 pounds per linear inch.

EXAMPLES 3 THRU 8

The procedure of Example 1 was repeated except that a third tie-layer component was added and the ratio of the tie-layer component was varied. The identity of the tie-layer components, the ratio of the tie-layer components and the resulting adhesion is shown in Table I.

TABLE I

Tie-Layers for Adhering Nitrile Barrier Resin to High Impact Polystyrene (HIPS)

| Example | Tie-Layer Components | Ratio of Components | Adhesion (lb/linear inch) |
|---|---|---|---|
| 1 | SBS/Nitrile Resin | 67/33 | 1.82 |
| 2 | SBS/Nitrile Resin | 50/50 | 3.40 |
| 3 | SIS/Nitrile Resin/HIPS | 60/20/20 | 1.22 |
| 4 | SBS/Nitrile Resin/HIPS | 50/25/25 | 1.22 |
| 5 | SIS/Nitrile Resin/HIPS | 20/60/20 | 0.63 |
| 6 | SIS/Nitrile Resin/HIPS | 20/40/40 | 1.38 |
| 7 | SIS/Nitrile Resin/HIPS | 20/20/60 | 0.59 |
| 8 | SIS/Nitrile Resin/ABS | 33/33/33 | 1.48 |

EXAMPLE 9

A tie-layer consisting of a powdered mixture of 56 parts by weight of SIS (Shell's Kraton 1111, a styrene-isoprene-styrene block copolymer elastomer), and 44 parts by weight of a nitrile barrier resin comprising a nitrile rubber modified acrylonitrile-methyl acrylate copolymer prepared according to Example VIII in U.S. Pat. No. 3,426,102 was extruded through a ¾ inch Brabender extruder, through a three-way combining adapter and finally through a 6 inch coextrusion die. The melt temperature of the tie-layer was about 390° to 400° F. Simultaneously, the nitrile barrier resin and a polypropylene were coextruded on either side of the tie-layer. A three-layer laminate was produced. The adhesion of the tie-layer to the outer layers of the laminate was 2.68 pounds per linear inch.

EXAMPLES 10 THRU 24

The procedure of Example 9 was repeated except that the tie-layer components and the ratio of the tie-layer components were varied. The identity of the tie-layer components, the ratio of the tie-layer components and the resulting adhesion is shown in Table II.

TABLE II

Tie-Layers for Adhering Nitrile Barrier Resin to polypropylene (PP)

| Example | Tie-Layer Components | Ratio of Components | Adhesion (lb/linear inch) |
|---|---|---|---|
| 9 | SIS/Nitrile Resin | 56/44 | 2.68 |
| 10 | SBS/Nitrile Resin | 44/56 | 1.20 |
| 11 | SIS/Nitrile Resin/PP | 70/15/15 | 1.53 |
| 12 | SIS/Nitrile Resin/PP | 66/17/17 | 1.14 |
| 13 | SIS/Nitrile Resin/PP | 60/20/20 | 1.59 |
| 14 | SIS/Nitrile Resin/PP | 57/31/12 | 3.41 |
| 15 | SIS/Nitrile Resin/PP | 57/12/31 | 0.24 |
| 16 | SIS/Nitrile Resin/PP | 50/25/25 | 1.31 |
| 17 | SIS/Nitrile Resin/PP | 45/40/15 | 3.28 |
| 18 | SIS/Nitrile Resin/PP | 45/15/40 | 0.11 |
| 19 | SIS/Nitrile Resin/PP | 44/28/28 | 2.81 |
| 20 | SIS/Nitrile Resin/PP | 41/51/8 | 2.51 |
| 21 | SIS/Nitrile Resin/PP | 33/33/33 | 1.0 |
| 22 | SBS/Nitrile Resin/PP | 30/56/14 | 2.32 |
| 23 | SBS/Nitrile Resin/PP | 17/42/42 | 2.80 |
| 24 | SIS/Nitrile Resin/PP/Polyurethane | 57/14/14/14 | 2.01 |

EXAMPLES 25 THRU 30

The procedure of Example 1 was repeated except that the components of the tie-layer, the ratio of the tie-layer components and the termoplastic resin used as the outer layer was varied as shown in Table III. The resulting heat adhesion of the laminate is also shown in Table III.

TABLE III

Tie-Layers for Adhering Nitrile Barrier Resin to Various Thermoplastic Resins

| Exam | Tie-Layer Components | Ratio of Comp. | Thermo-Plastic Resins | Adhesion (lb/linear inch) |
|---|---|---|---|---|
| 25 | SIS/Nitrile Resin/HDPE | 60/20/20 | HDPE | 2.0 |
| 24 | SIS/Nitrile Resin/PVC | 60/20/20 | PVC | 2.7 |
| 27 | SIS/Nitrile Resin/ABS | 60/20/20 | ABS | 1.8 |
| 28 | SIS/Nitrile Resin/SAN | 60/20/20 | SAN | 2.9 |
| 29 | SIS/Nitrile Resin/Nylon-11 | 60/20/20 | Ny-11 | 1.7 |

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A laminated structure comprising
   (i) a first outer layer comprising a nitrile barrier resin,
   (ii) a tie-layer comprising a mixture of (1) a nitrile barrier resin, and (2) a vinyl aromaticdiene block copolymer rubber, and
   (iii) a second outer layer comprising a thermoplastic resin.

2. The structure of claim 1 wherein the nitrile barrier resin comprises
   (A) from 60% to 90% by weight of at least one nitrile having the structure:

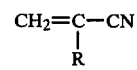

wherein R is hydrogen, a lower alkyl group having from 1 to 4 carbon atoms, or a halogen,
   (B) from 10% to 40% by weight based on the combined weight of (A) and (B) of at least one member selected from the group consisting of
      (1) an ester having the structure:

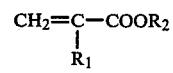

wherein $R_1$ is hydrogen, an alkyl group having from 1 to 4 carbon atoms, or a halogen, and $R_2$ is an alkyl group having from 1 to 6 carbon atoms,
      (2) an alpha-olefin having the structure:

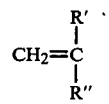

wherein R' and R'' are alkyl groups having from 1 to 7 carbon atoms.
      (3) a vinyl ether selected from the group consistibng of methyl vinyl ether, ethyl vinyl ether, the propyl vinyl ethers, and the butyl vinyl ethers.
      (4) vinyl acetate,
      (5) styrene, and
      (6) indene,
   and optionally from 0 to 40 parts by weight of
   (C) a rubbery polymer of a conjugated diene monomer selected from the group consisting of butadiene and isoprene and optionally a comonomer selected from the group consisting of styrene, a nitrile monomer having the structure:

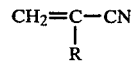

wherein R has the foregoing designation, and an ester having the structure:n

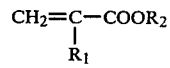

wherein $R_1$ and $R_2$ have the foregoing designations, said rubbery polymer containing from 50% to 100% by weight of polymerized conjugated diene and from 0% to 50% by weight of comonomer.

3. The structure of claim 1 wherein the second outer layer is selected from the group consisting of styrenics, polyolefins, polyurethanes, polyvinyl chlorides, polysulfones, polycarbonates and polyamides.

4. The structure of claim 1 wherein the tie-layer comprises (1) a nitrile barrier resin, (2) a vinyl aromaticdiene block copolymer rubber, and (3) one or more additional thermoplastic resins.

5. The structure of claim 4 wherein these thermoplastic resins are selected from the group consisting of styrenics, polyolefins, polyurethanes, polyvinyl chlorides, polysulfones, polycarbonates and polyamides.

6. The structure of claim 4 wherein the thermoplastic resin in the tie-layer is the same as the thermoplastic resin which comprises the second outer layer.

7. The structure of claim 4 wherein the tie-layer contains a fourth component comprising a polyurethane.

8. The structure of claim 1 wherein the vinyl aromatic-diene block copolymer rubber is either a styrenebutadiene-styrene or styrene-isoprene-styrene block copolymer rubber.

9. The structure of claim 1 wherein the tie-layer contains 15 to 70% of the vinyl aromatic-diene block copolymer rubber.

10. The structure of claim 9 wherein the tie-layer contains 40 to 60% of the vinyl aromatic-diene block copolymer rubber.

11. The structure of claim 1 wherein the tie-layer contains 10 to 60% of the nitrile barrier resin.

12. The structure of claim 11 wherein the tie-layer contains 25 to 40% of the nitrile barrier resin.

13. The structure of claim 4 wherein the tie-layer contains 5 to 25% of (3).

* * * * *